United States Patent
Lim

(10) Patent No.: US 7,203,051 B2
(45) Date of Patent: Apr. 10, 2007

(54) APPARATUS FOR CONTROLLING POWER AND SIGNAL OF ELECTRONIC EQUIPMENT WITH CONTROLLING UNIT AND SUBORDINATE UNIT

(75) Inventor: Heui-Do Lim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 694 days.

(21) Appl. No.: 10/426,608

(22) Filed: Apr. 30, 2003

(65) Prior Publication Data

US 2003/0232632 A1   Dec. 18, 2003

(30) Foreign Application Priority Data

Jun. 18, 2002   (KR) .................... 10-2002-0034124

(51) Int. Cl.
*H02H 3/00* (2006.01)
(52) U.S. Cl. ..................................... 361/119; 361/58
(58) Field of Classification Search ................ 361/119, 361/58, 42
See application file for complete search history.

(56) References Cited

U.S. PATENT DOCUMENTS 5,491,816 A * 2/1996 Matoba et al. ................. 714/2
6,583,678 B2 * 6/2003 Kunzer ....................... 332/106

* cited by examiner

*Primary Examiner*—Stephen W. Jackson
(74) *Attorney, Agent, or Firm*—The Farrell Law Firm

(57) ABSTRACT

The present invention is related to electronic equipment having a controlling unit and a subordinate unit, and more particularly, to an apparatus for controlling power and signal of electronic equipment having a controlling unit and a subordinate unit which can reduce power consumption by turning off power to an unused subordinate unit at a certain period of time, and effectively reducing leakage current that flows from the controlling unit to the subordinate unit in the apparatus for extending battery usage time, and prevent distortion of waveforms of the subordinate unit's input end being sent from the controlling unit. The apparatus includes switch operation circuit unit connected to signal control line to prevent leakage current flowing toward the subordinate unit by signal level of the controlling unit being authorized to the signal control line; capacitors connected to the signal control line, that exist on the signal control line and inside of the subordinate module; and residual current element removing unit for discharging residual current charged in the capacitors, in order to prevent distortion of signals that are authorized from the controlling unit to the subordinate unit.

9 Claims, 7 Drawing Sheets

APPARATUS FOR CONTROLLING POWER AND SIGNAL OF ELECTRONIC EQUIPMENT WITH CONTROLLING UNIT AND SUBORDINATE UNIT

PRIORITY

This application claims priority to an application entitled "Apparatus For Controlling Power and Signal of Electronic Equipment With Controlling Unit and Subordinate Unit" filed in the Korean Industrial Property Office on Jun. 18, 2002 and assigned Serial No. 02-34124, the contents of which are incorporated herein by reference.

BACKGROUND OF THE INVENTION

1. Field of the Invention

The present invention relates generally to electronic equipment with controlling and controlled units, and more particularly to an apparatus for controlling power and signal of electronic equipment with a controlling unit and a subordinate unit.

2. Description of the Related Art

In general, electronic equipment has many functional sections to which subordinate modules like a controlling unit, an inputting unit, or a processing unit are connected. One example of a piece of electronic equipment having a controlling unit and a subordinate module is cellular phone. Usually, one can save power consumption or increase battery usage time by turning off power supplied to the subordinate module that is not used at a certain time.

FIG. 1 is a block diagram showing an apparatus for controlling power and signal of a piece of electronic equipment having a controlling unit and a subordinate module in accordance with a related art. Referring to FIG. 1, connected between controlling unit 2 and subordinate module 4 is a signal control line 6 for authorizing operation control signals to subordinate module 4, and a power control line 8 for authorizing power control signals. A resistor R1 is serially connected onto signal control line 6, and connected to one end of capacitors C1, C2, and C3, having their other ends being connected to ground. Particularly, capacitor C1 is for removing noise on the signal control line 6, capacitor C2 is a virtual capacitor for indicating capacitance elements existing on signal control line 6, and capacitor C3 is also a virtual capacitor for indicating capacitance elements of subordinate module 4.

FIG. 2 shows waveforms of each unit in FIG. 1. More specifically, reference (a) indicates a waveform of the power control signals at subordinate module 4 input end, (b) indicates a waveform of the operation control signals at controlling unit 2 output end, and (c) indicates a waveform of the operation control signals at subordinate module 4 input end.

As shown in the drawing, power of subordinate module 4 is turned off for the time interval A (t0~t1, t4~) where the power control signal sent to subordinate module 4 is at a 'low' state, while power of subordinate module 4 is turned on for time intervals B (t1~t2, t3~t4) and C (t2~t3) where the power control signal sent to subordinate module 4 is at an 'active high' state. However, during A interval, namely when the power control signal is at a 'low' state and the operation control signal is at a 'high' state, the signal level of operation control signal at 'high' state, e.g., 3V, often causes leakage current toward subordinate module 4 even though resistor R1 is connected onto signal control line 6 to prevent leakage current in some degree.

Leakage current through subordinate module 4 via the signal control line during the time interval A is determined by the voltage difference between the two ends of resistor R1 and the resistance value for the time interval A shown in FIG. 2(c). In short, leakage current is calculated by using the formula: (3V−1V)/R1. Moreover, the relation between the resistance value of resistor R1 and the impedance value of the signal control line 6 of subordinate module 4 during the time interval A determines the operation control signal level of subordinate module 4 at the input end. For instance, if resistance value of resistor R1 is increased, the voltage across resistor R1 is increased, relatively lowering the operation control signal level of subordinate module 4 at the input end. However, the degree of any decrease in the operation control signal level is relatively small, compared with the degree of the increase in resistor R1, such that it can be disregarded. Nevertheless, there is a limit to reducing leakage current by setting resistor R1 infinitely large. The reason is that when resistor R1 value is set infinitely large, the operation control signal level to be input to subordinate module 4 cannot be disregarded any more.

In addition, time constant is affected by resistor R1 value and a CT value, the composite capacitance of three capacitances existing on signal control line, i.e., CT=C1+C2+C3. If resistor R1 value is set high, the time constant is increased. As a result, waveforms of the operation control signals of subordinate module 4 at the input end are distorted as depicted in FIG. 2(c). Further, as the same drawing manifests, the distorted waveform during the time interval C causes error with operation of subordinate module 4. This means that resistor R1 value and CT value should be lowered to reduce the degree of distortion in waveforms of the operation control signal of subordinate module 4 at the input end. However, CT value is not a definite value because of C2 and C3 elements, and there is a limit to lower that value. This leaves only one option to lower resistor R1 value to reduce distortion in waveforms of the operation control signals of subordinate module 4 at the input end. Unfortunately though, if resistor R1 value is lowered, one cannot effectively prevent leakage current toward subordinate module 4 through signal control line 6 during the time interval A.

SUMMARY OF THE INVENTION

It is, therefore, an object of the present invention to provide an apparatus for controlling power and signal of electronic equipment having a controlling unit and a subordinate unit, in which the apparatus consumes less power and increases battery usage time.

Another object of the present invention is to provide an apparatus for controlling power and signal of electronic equipment having a controlling unit and a subordinate unit, which is capable of more effectively reducing leakage current toward the subordinate module from the controlling unit when power of the subordinate module is turned off and preventing distortion of waveforms of subordinate module 4 at the input end when power of the subordinate module is turned on and the operation control signal on the signal control line is sent as an 'active low' signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIGS. 3 through 6 are block diagrams illustrating various apparatus for controlling power and signal of electronic equipment having controlling unit and subordinate unit in accordance with embodiments of the present invention.

Figure 5:
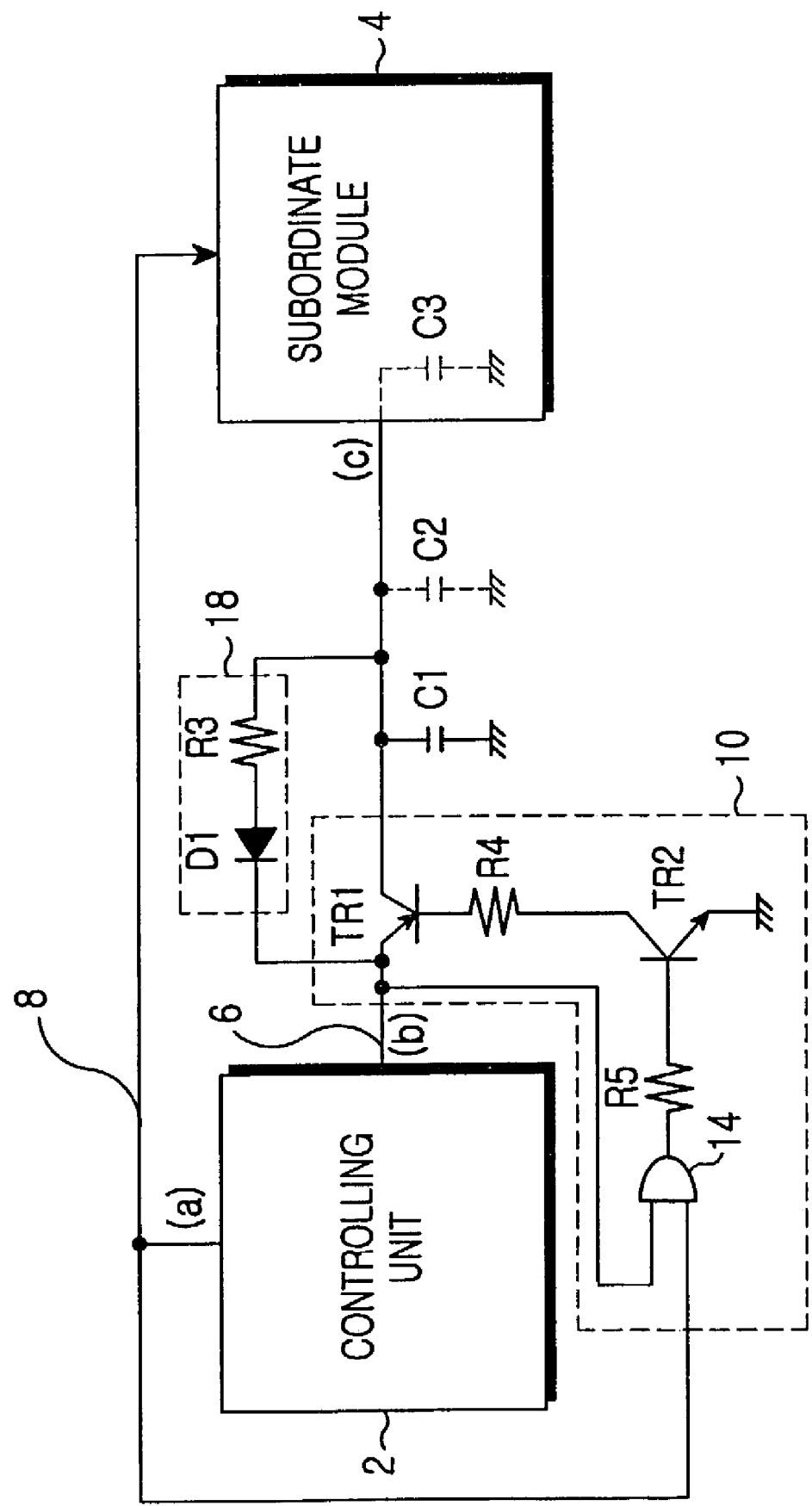
Figure 6:
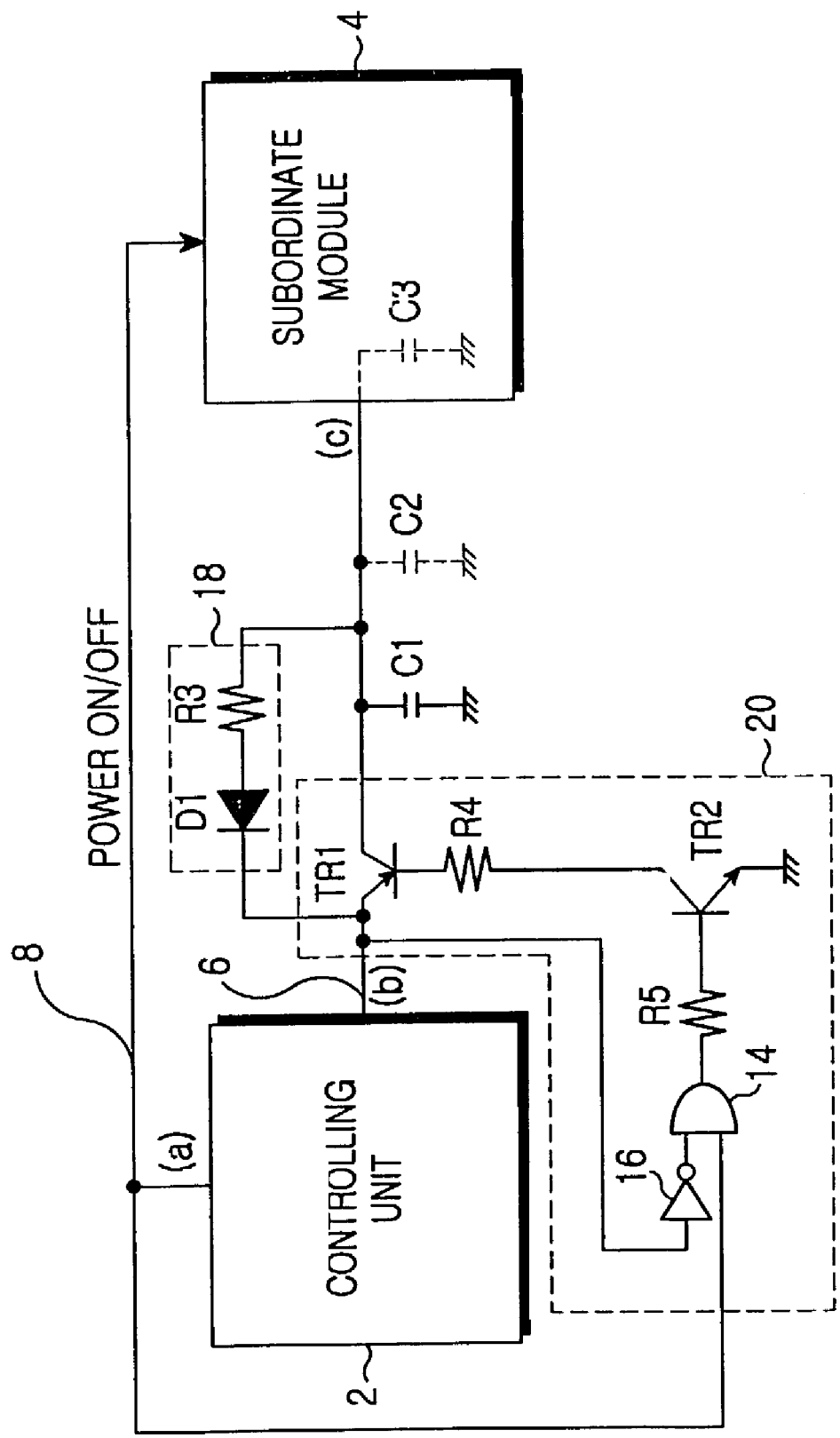
Figure 7:
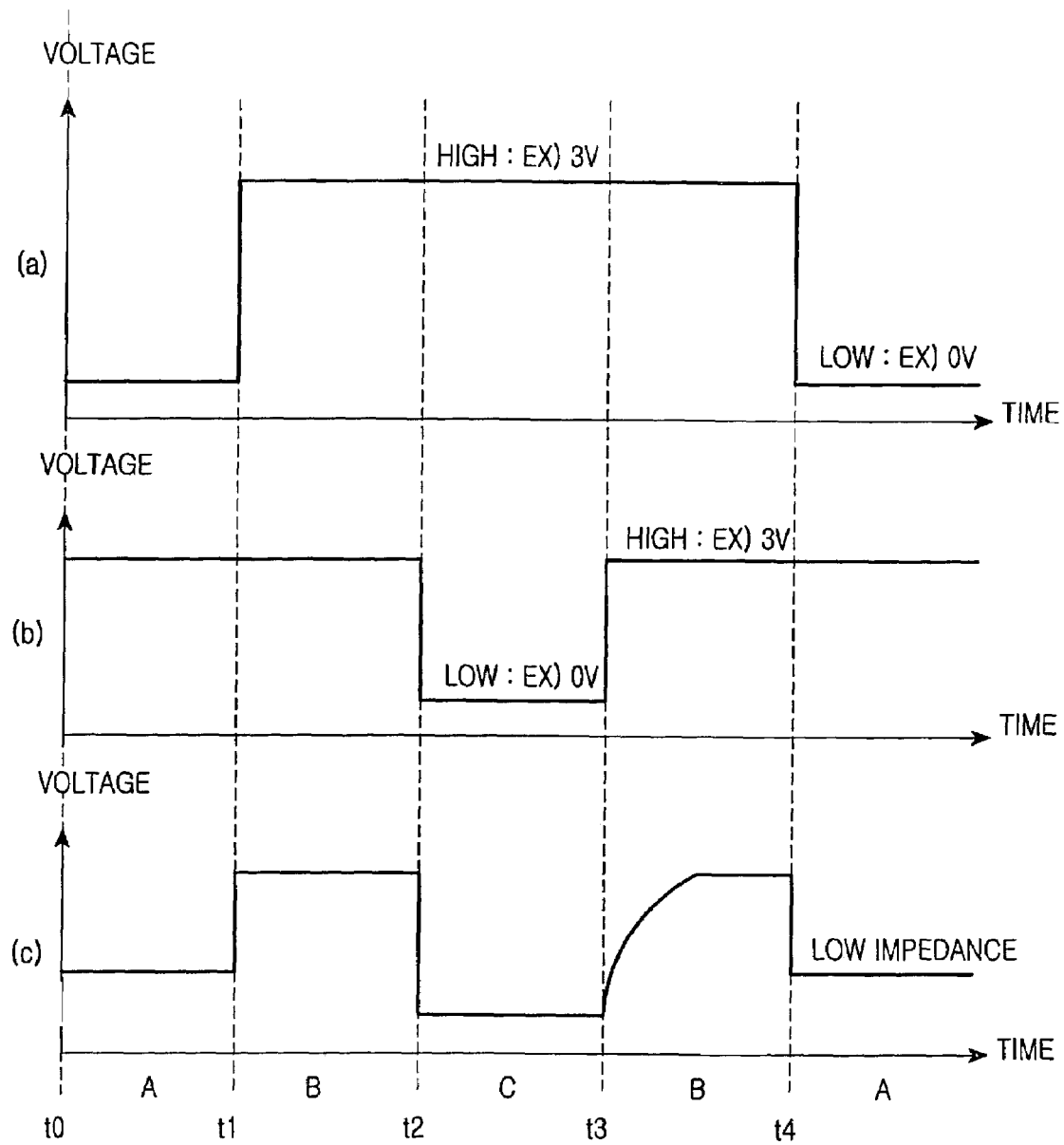
FIG. 7 shows waveforms of each unit of FIGS. 3 through 6.

FIG. 7 represents waveforms of each unit of FIGS. 3 through 6. More specifically, reference (a) represents a waveform of power control signals at subordinate module 4 input end, (b) represents a waveform of operation control signals at controlling unit 2 output end, and (c) represents a waveform of operation control signals at subordinate module 4 input end in accordance with the embodiments of the present invention.

As shown in the drawing, the power of subordinate module 4 is turned off for the time interval A (t0~t1, t4~) where power control signal sent to subordinate module 4 is at a 'low' state, the power of subordinate module 4 is turned on for time intervals B (t1~t2, t3~t4) and C (t2~t3) where power control signal sent to subordinate module 4 is at an 'active high' state.

Figure 3:
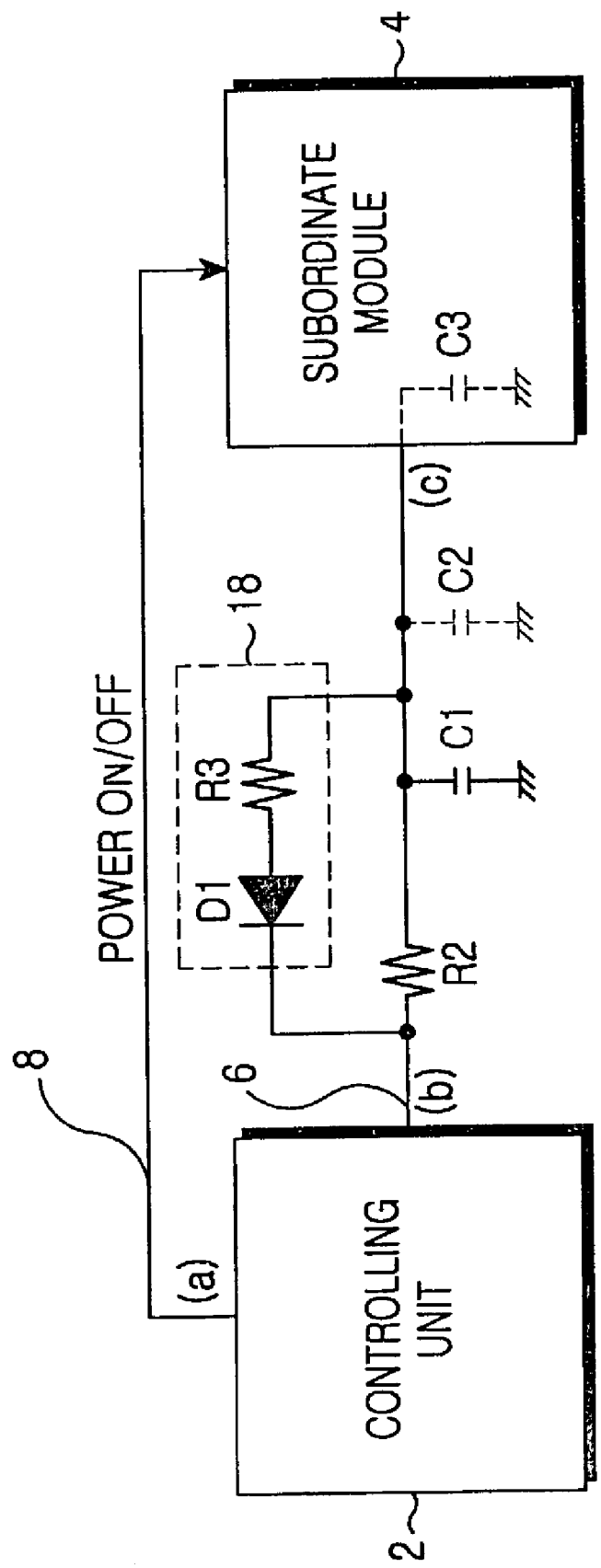
FIGS. 3 through 6 are block diagrams illustrating an apparatus for controlling power and signal of electronic equipment having a controlling unit and a subordinate unit in accordance with embodiments of the present invention.

FIG. 3 is a circuit diagram of a first embodiment of the present invention introduces an apparatus for controlling power and signal of electronic equipment having a controlling unit and a subordinate unit, which includes residual current element removing unit 18.

Referring to FIG. 3, connected between controlling unit 2 and subordinate module 4 is a signal control line 6 for sending operation control signals to subordinate module 4, and a power control line 8 for sending power control signals. A resistor R2 is serially connected into signal control line 6, and connected to one end of capacitors C1, C2, and C3, having their other ends connected to ground, and charged residual current element removing unit 18 is connected to capacitors C1, C2, and C3 and across resistor R2.

Figure 1:
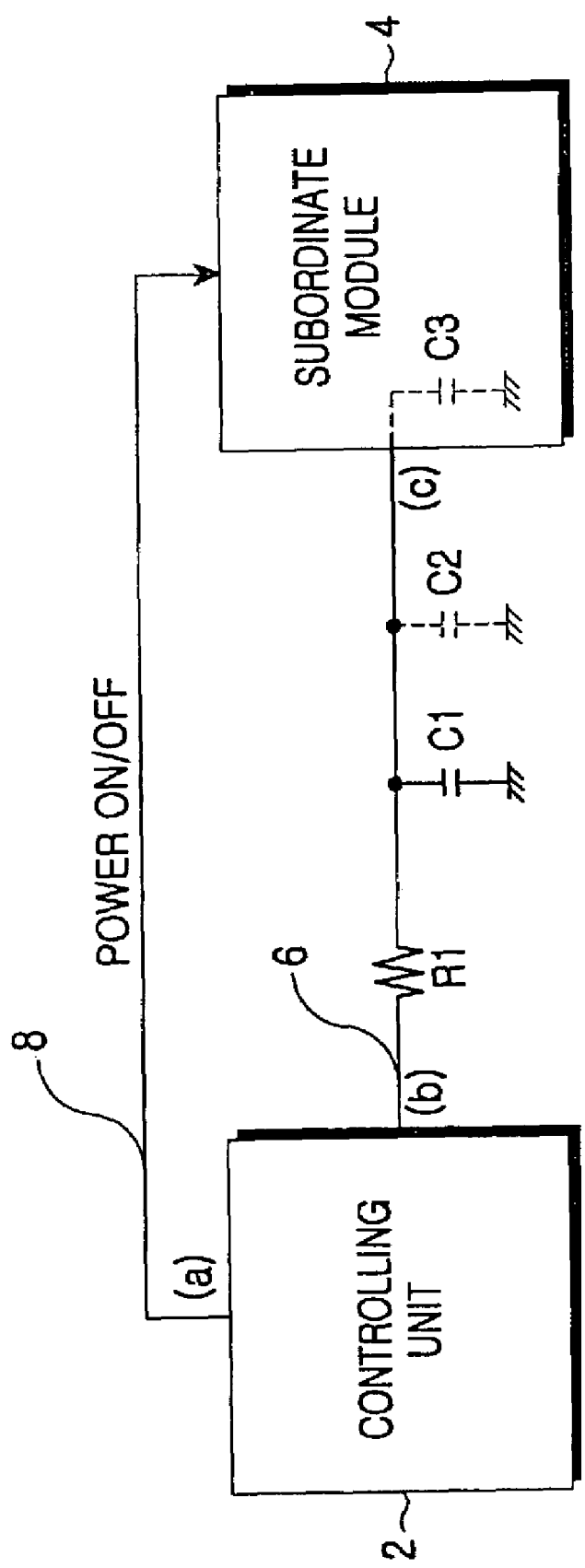
FIG. 1 is a block diagram showing an apparatus for controlling power and signal of electronic equipment having controlling unit and subordinate module in accordance with a related art.
Figure 2:
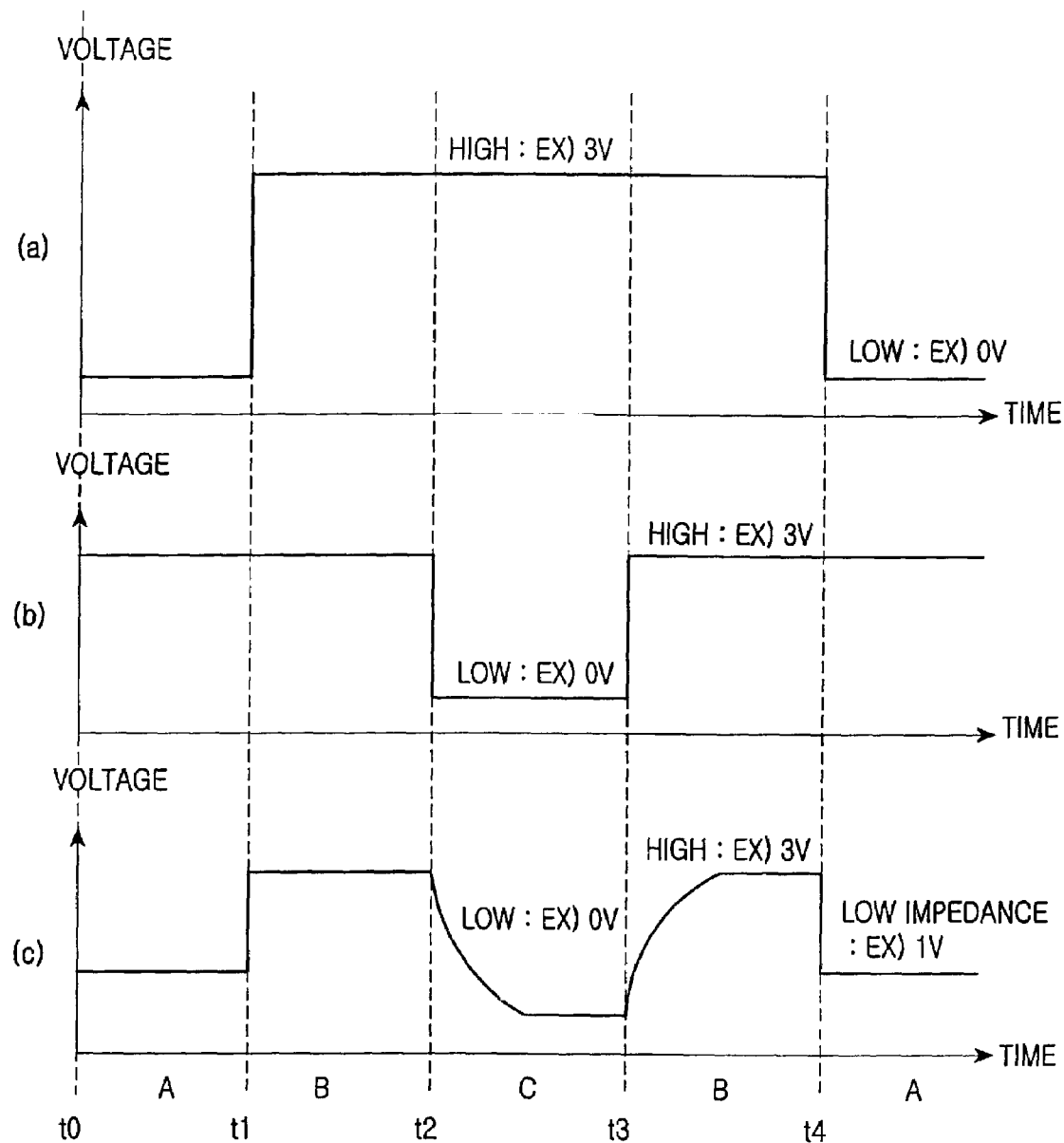
FIG. 2 shows waveforms of each unit of FIG. 1.

As already mentioned, the first embodiment of the present invention is characterized by residual current element removing unit 18 that is installed in the direction of controlling unit 2 from subordinate module 4. Residual current element removing unit 18 includes diode D1 and resistor R3 that are connected to signal control line 6 toward controlling unit 2. As FIG. 7 shows, residual current element removing unit 18 discharges the residual current being charged in capacitors C1, C2, and C3 during the time interval B, to the direction of controlling unit 2 as the time interval changes from B to C. Resistor R3 value, compared to resistor R2 value, is very small. This lowers the time constant, and prevents distortion of the waveform of subordinate module 4 at the input end during the time interval C. In this way, one does not have to worry about the influence of resistor R2 value and CT value (CT=C1+C2+C3) upon the distortion of the waveform of subordinate module 4 at the input end. In fact, resistor R2 value can be increased enough so as not to lower the operation control signal level that is input in subordinate module 4. Further, the value can be chosen to minimize leakage current that flows toward subordinate module 4 from controlling unit 2 during the time interval A. In other words, since resistor R2 value of FIG. 3 is greater than resistor R1 value of FIG. 1, the leakage current during the time interval A in FIG. 7, (3V−1V)/R2, is than the leakage current during the time interval A in FIG. 2, (3V−1V)/R1.

Figure 4:
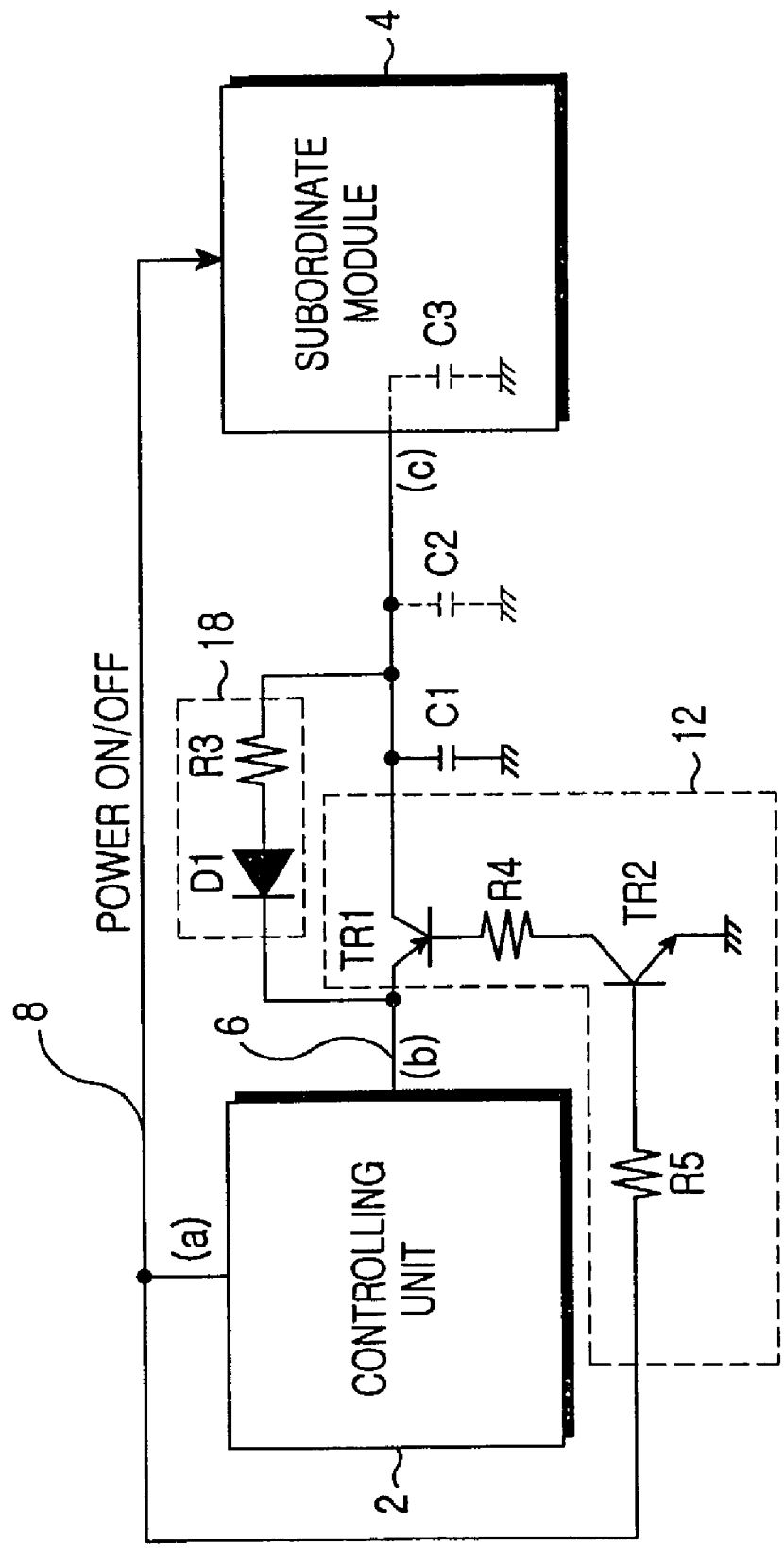

FIG. 4 is a circuit diagram of a second embodiment of the present invention introduces an apparatus for controlling power and signal of electronic equipment having a controlling unit and a subordinate unit, which includes a switch operation and a residual current element removing circuit unit 12 and a residual current element removing unit 18.

Referring to FIG. 4, controlling unit 2 and subordinate module 4 are connected by signal control line 6 that sends operation control signals to the subordinate module 4 and power control line 8 that sends power control signals. Also, switch operation and residual current element removing circuit unit 12 is further connected to signal control line 6 and power control line 8. One end of each of capacitors C1, C2, and C3 is connected to signal control line 6, while the other end of each capacitor is connected to ground. Residual current element removing unit 18 for removing the remaining current is charged in capacitors is connected in the direction of subordinate module 4 from controlling unit 2.

As depicted in FIG. 4, a most distinctive feature of the second embodiment of the present invention is that switch operation and charged residual current element removing circuit unit 12 including transistors TR1 and TR2 and resistors R4 and R5 replace resistor R2 shown FIG. 3. Further, residual current element removing unit 18 is connected in the direction of controlling unit 2 from subordinate module 4 across transistor TR1.

As shown in FIG. 4, switch operation and residual current element removing unit 12 includes transistor TR1 in which the emitter is connected to controlling unit 2 on signal control line 6, the collector is connected toward subordinate module 4 on signal control line 6, and base end is connected to the collector end of transistor TR2 through resistor R4. In case of transistor TR2, the emitter is connected to the ground, collector end is connected to base end of TR1, and base end is connected to power control line 8. Resistor R5 is connected between power control line 8 and the base of transistor TR2.

Switch operation and residual current element removing unit 12 having the above-described structure operates in synchronization with the power control signal on power control line 8. For example, as illustrated in FIG. 7, a power control signal on power control line 8, namely a 'low' state, is sent to the base of transistor TR2 during the time interval A, and accordingly, the collector and emitter of transistor TR2 are turned off. In other words, transistor TR1 performs a switching operation to turn signal control line 6 off in accordance with the operation of transistor TR2, and leakage current from controlling unit to subordinate module 4 on signal control line 6 during the time interval A can be absolutely prevented.

In the meantime, since transistor TR1 included in switch operation and residual current element removing unit 12 is a pnp type transistor, charged residual current in capacitors C1, C2, and C3 during the time interval B flows in the direction of the base from the collector of transistor TR1 during the time interval C, given that the time interval is changed from B to C as shown in FIG. 7 (b). The charged residual current in capacitors C1, C2, and C3 travels R4, and is discharged to the ground in the direction of the emitter from the collector of transistor TR2. In this manner, distortion of subordinate module 4 at its input end during the time interval C can be prevented in some degrees.

FIG. 4 confirms that residual current element removing unit 18 has the identical structure and performs the same operation with that of the first embodiment described before. That is, diode D1 and resistor R3 discharge residual current charged in the capacitors towards controlling unit 2 during the time interval B as the time interval changes from B to C. Therefore, as FIG. 7 manifests, distortion of waveforms of subordinate module 4 at the input end can be reduced during the time interval C.

On the other hand, switching operation and residual current removing circuit unit 12 shown in FIG. 4, generates leakage current as much as (3V−0.7V)/R5 through the base of transistor TR1 and resistor R5 during the time intervals B and C, except for the time interval A. However, if the time intervals B and C do not last long or are only small amount of time out of the entire time, the leakage current can be disregarded.

A third embodiment of the present invention introduces an apparatus for controlling power and signal of electronic equipment having a controlling unit and a subordinate unit, and includes a switch operation circuit unit 10 and residual current element removing unit 18.

Referring to FIG. 5, controlling unit 2 and subordinate module 4 are connected by signal control line 6 that carries operation control signals to the subordinate module 4 and power control line 8 that authorizes power control signals. Also, switch operation circuit unit 10 is further connected to signal control line 6 and power control line 8. One end of each of capacitors C1, C2, and C3 is connected to signal control line 6, while the other end of each capacitor is being connected to ground. Similar to before, residual current element removing unit 18 for removing remaining current that is charged in the capacitors is connected in the direction of subordinate module 4 from controlling unit 2.

As explained before, a major distinctive feature of the third embodiment of the present invention is that switch operation circuit unit 10 including transistors TR1 and TR2, resistors R4 and R5, and AND gate 14 replace switch operation and residual current element removing circuit unit 12 shown FIG. 3. Similar to the first embodiment, residual current element removing unit 18 is connected in the direction of controlling unit 2 from subordinate module 4.

As FIG. 5 shows, switch operation circuit unit 10 has the following structure. First of all, the emitter of transistor TR1 is connected to controlling unit 2, the collector is connected to subordinate module 4 on signal control line 6, and the base is connected to the collector of transistor TR2 through resistor R4. In the case of transistor TR2, the collector is connected to the base of transistor TR1, emitter to ground, and the base to output end of AND gate 14. Input end of AND gate 14 is connected to power control line 8 and signal control line 6, respectively, and the output end thereof is connected to the base of transistor TR2. Resistor R4 is connected between the base of transistor TR1 and the collector of transistor TR2. Resistor R5 is connected to the output end of AND gate 14 and the base of transistor TR2.

The switch operation circuit unit 10 is operated in conforming to logic-gated signal of operation control signal on power control signal on power control line 8 and operation control signal on signal control line 6. For instance, the collector and the emitter of transistor TR2 are turned on only when power control signal is at an 'active high' state and operation control signal is at a 'high' state, as shown in FIG. 7. Following this, transistor TR1 performs switching operation for connecting signal control line 6. In this way, leakage current flowing from the controlling unit 2 to the subordinate module 4 on signal control line 6 during the time intervals except the time interval B can be perfectly prevented.

FIG. 5 confirms that residual current element removing unit 18 has the identical structure and performs the same operation with that of the first embodiment described before. That is, diode D1 and Resistor R3 discharge residual current charged in the capacitors towards controlling unit 2 during the time interval B as the time interval changes from B to C. Therefore, as FIG. 7 manifests, distortion of waveforms of subordinate module 4 at its input end can be reduced during the time interval C.

On the other hand, during the time interval B as shown in FIG. 7, that is, when power control signal is at an 'active high' state and operation control signal is at a 'high' state, leakage current is generated through resistor R5 and transistor TR1. The leakage current amounts to (3V−1V)/R5, but if the time interval B lasts very briefly, the leakage current can be disregarded.

A fourth embodiment of the present invention introduces an apparatus for controlling power and signal of electronic equipment having a controlling unit and a subordinate unit, and includes a switch operation circuit unit 20 and a residual current element removing unit 18.

Referring to FIG. 6, controlling unit 2 and subordinate module 4 are connected by signal control line 6 that carries operation control signals to the subordinate module 4, and power control line 8 that carries power control signals. Also, switch operation circuit unit 20 is further connected to signal control line 6 and power control line 8. One end of capacitors C1, C2, and C3 is connected to signal control line 6, while the other end of each of the capacitors is connected to ground. Again, residual current element removing unit 18 for removing remaining current that is charged in the capacitors is connected is the direction of subordinate module 4 from controlling unit 2.

As explained before, a major distinctive feature of the third embodiment of the present invention is that switch operation circuit unit 10 includes transistors TR1 and TR2, resistors R4 and R5, AND gate 14, and inverter 16. Similar to the first embodiment, residual current element removing unit 18 is connected in the direction of controlling unit 2 from subordinate module 4.

As FIG. 6 shows, switch operation circuit unit 20, unlike switch operation circuit unit 10 shown in FIG. 5, further includes inverter 16 that is connected between signal control line 6 and the input end of AND gate 14.

The switch operation circuit unit 20 is operated in conforming to logical-gated signal of operation control signal on power control signal on power control line 8 and operation control signal on signal control line 6. More specifically, the collector and the emitter of transistor TR2 are turned on only when power control signal is at an 'active high' state and operation control signal is at an 'active low' state, as shown in FIG. 7. Following this, transistor TR1 performs switching operation for connecting signal control line 6. In this way, leakage current flowing from controlling unit 2 to subordinate module 4 on signal control line 6 during the time intervals except the time interval C can be perfectly prevented.

FIG. 5 confirms that residual current element removing unit 18 has the identical structure and performs the same operation with that of the first embodiment described before. That is, diode D1 and resistor R3 discharge residual current charged in the capacitors towards controlling unit 2 during the time interval B as the time interval changes from B to C. Therefore, as FIG. 7 manifests, distortion of waveforms of subordinate module 4 input at its end can be reduced during the time interval C.

On the other hand, during the time interval C as shown in FIG. 7, that is, when power control signal is at an 'active high' state and operation control signal is at an 'active low' state, leakage current is generated through resistor R5 and transistor TR1. The leakage current amounts to (3V−1V)/R5, but if the time interval C lasts very briefly, the leakage current can be disregarded.

In conclusion, the apparatus for controlling power and signal of electronic equipment having a controlling unit and a subordinate unit according to the present invention can advantageously reduce leakage current and further power consumption, and increase battery usage time. Especially, the present invention is effective for preventing distortion of waveforms at the input end of subordinate module when operation control signal on signal control line is authorized to an 'active low' signal, given that the subordinate module is turned on.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for controlling power and signal of electronic equipment having a controlling unit and a subordinate module, wherein a power control line and a signal control line connect the controlling unit and the subordinate module, the apparatus comprising:
    a resistor part connected between the controlling unit and the subordinate module for minimizing leakage current when power of the subordinate module is turned off, while enabling a rated current to flow through the signal control line when power to the subordinate module is turned on;
    a capacitor part connected between the signal control line and ground; and
    a residual current element removing unit for discharging residual current charged in the capacitor part and capacitance existing in the subordinate module, in order to prevent distortion of signals that are carried from the controlling unit to the subordinate module, wherein the residual current element removing unit further comprises a diode and a resistor part that is connected in series, the diode connected in a direction of the controlling unit from the subordinate module.

2. The apparatus according to claim 1, wherein the resistor part is serially connected in the signal control line to flow a rated current through the signal control line while minimizing leakage current that flows toward the subordinate module by a signal level of the controlling unit carried on the signal control line, when the power of the subordinate module is turned on.

3. The apparatus according to claim 1, wherein the residual current element removing unit is connected in parallel with the resistor part of the signal control line to discharge residual current charged in the capacitor part and subordinate module for preventing distortion of signals that are carried from the controlling unit to the subordinate module, when the signal level of the controlling unit carried to the signal control line is less than signal level of the subordinate module.

4. An apparatus for controlling power and signal of electronic equipment having a controlling unit and a subordinate module, wherein a power control line and a signal control line connect the controlling unit and the subordinate module, the apparatus comprising:
    a switch operation circuit unit for selectively switching the signal control line on module, in order to remove leakage current that flows while power to the subordinate module is turned off, wherein the switch operation circuit unit selectively switches the signal control line on the basis of signals of the power control line and signal control line of the subordinate module, for reducing leakage current that flows in a direction of the subordinate module by a signal level of the controlling unit carried to the signal control line while power of the subordinate module is turned off;
    a capacitor connected to the signal control line to ground; and
    a residual current element removing unit for discharging residual current charged in the capacitor and the subordinate module, for reducing distortion of signals that are carried from the controlling unit to the subordinate module.

5. The apparatus according to claim 4, wherein the residual current element removing unit is connected in parallel with the signal control line to discharge residual current charged in the capacitor and the subordinate module for preventing distortion of signals that are carried from the controlling unit to the subordinate module, when the signal level of the controlling unit sent to the signal control line is less than a signal level of the subordinate module.

6. The apparatus according to claim 4, wherein the switch operation circuit unit comprises:
    a first transistor, having an emitter connected to the controlling unit and a collector connected to the subordinate module;
    a second transistor, having an emitter connected to ground, and a collector connected to a base of the first transistor;
    an AND gate, having one input connected to the power control line and a second input connected to the signal control line, and an output connected to a base second transistor;
    a first resistor connected between the base end of the first transistor and the collector end of the second transistor; and
    a second resistor connected between the power control line and the base of the second transistor.

7. The apparatus according to claim 4, wherein the switch operation circuit unit comprises:
    a first transistor, having an emitter connected to the controlling unit and a collector connected to the subordinate module;
    a second transistor, having an emitter connected to ground, and a collector connected to a base of the first transistor;
    a first resistor connected between the base of the first transistor and the collector of the second transistor; and
    a second resistor, which is connected between the power control line and a base end of the second transistor.

8. The apparatus according to claim 4, wherein the switch operation circuit unit comprises:

a first transistor, having an emitter connected to the controlling unit and a collector connected to the subordinate module;

a second transistor, having an emitter connected to ground, and a collector connected to a base end of the first transistor;

an AND gate, having one input connected to the power control line;

an inverter having an input connected to the signal control line, and an output connected to a second input of the AND gate;

a first resistor connected between the base end of the first transistor and the collector end of the second transistor; and a second resistor connected between an output of the AND gate and a base of the second transistor.

9. An apparatus for controlling power and signal of electronic equipment having a controlling unit and a subordinate module, wherein a power control line and a signal control line connect the controlling unit and the subordinate module, the apparatus comprising:

a resistor part connected between the controlling unit and the subordinate module for minimizing leakage current when power of the subordinate module is turned off, while enabling a rated current to flow through the signal control line when power to the subordinate module is turned on, wherein the resistor part is serially connected in the signal control line to flow a rated current through the signal control line while minimizing leakage current that flows toward the subordinate module by a signal level of the controlling unit carried on the signal control line, when the power of the subordinate module is turned on;

a capacitor part connected between the signal control line and ground; and a residual current element removing unit for discharging residual current charged in the capacitor part and capacitance existing in the subordinate module, in order to prevent distortion of signals that are carried from the controlling unit to the subordinate module.

* * * * *